United States Patent [19]
Franz

[11] 3,983,930
[45] Oct. 5, 1976

[54] TEMPERATURE CONTROL SYSTEM AND MULTIFUNCTIONAL SERVOMOTOR THEREFOR

[75] Inventor: Rudolph J. Franz, Schaumburg, Ill.

[73] Assignee: Eaton Corporation, Cleveland, Ohio

[22] Filed: Sept. 24, 1973

[21] Appl. No.: 399,882

[52] U.S. Cl. ............................... 165/31; 165/42;
200/83 Q; 236/13; 236/87; 237/12.3 B
[51] Int. Cl.² ........................................ F25B 29/00
[58] Field of Search ..................... 165/23, 42–44,
165/31, 41; 236/13, 87; 237/12.3 B; 200/83
Q, 83 R; 251/61.2–61.5; 137/554

[56] References Cited
UNITED STATES PATENTS

| | | | |
|---|---|---|---|
| 3,263,739 | 8/1966 | Gaskill et al. | 165/28 |
| 3,315,730 | 4/1967 | Weaver et al. | 165/23 |
| 3,373,934 | 3/1968 | Kolbe et al. | 236/87 |
| 3,428,115 | 2/1969 | Caldwell | 165/23 |
| 3,724,752 | 4/1973 | Andres et al. | 165/42 |
| 3,731,729 | 5/1973 | Beatenbough et al. | 165/42 |
| 3,774,676 | 11/1973 | Franz | 165/23 |

*Primary Examiner*—Albert W. Davis, Jr.
*Assistant Examiner*—James D. Liles
*Attorney, Agent, or Firm*—Teagno & Toddy

[57] ABSTRACT

An automatic control system for regulating the temperature of the passenger compartment in an automotive vehicle is simplified and improved by the use of a power servomotor having a vacuum motor, an electrical programmer, and a diverter valve as component parts thereof. The servomotor controls the position of a plenum mounted air blend door regulating the passage of cold, tempered, or heated air into the passenger compartment. The servomotor also controls the position of the electrical programmer which in turn controls desired blower speeds and certain other system functions. The servomotor further controls the position of the linear diverter valve which ports vacuum in accordance with predetermined conditions to other vacuum actuated motors employed in the system.

20 Claims, 9 Drawing Figures

TEMPERATURE CONTROL SYSTEM AND MULTIFUNCTIONAL SERVOMOTOR THEREFOR

This invention relates to an automatic temperature control system for the passenger compartment of an automotive vehicle or the like and, more particularly, to a multifunctional power servomotor employed as a component part thereof.

The invention is particularly applicable to a servomotor simultaneously controlling several functions of an automatic temperature control system for use in automotive vehicles and the like and will be described with particular reference thereto. However, it will be appreciated by those skilled in the art, that the subject invention may have broader applications and may be used as a means for controlling any type of system which senses varying pressures and correlates same into predetermined conditions whereby the system is controlled.

Automatic temperature control systems for maintaining a predetermined temperature in the passenger compartment of an automotive vehicle and the like generally comprise a one-piece housing containing a plenum therein which is mounted in the vehicle. The plenum is defined by a plurality of ducts which are opened and closed by doors actuated by vacuum motors in predetermined sequences to feed heated, cooled, blended or fresh air to various areas in the passenger compartment. Associated with the actuation of the vacuum motors is a blower motor operable at predetermined speeds to pass cooled, heated, blended or fresh air through the various ducts. The plenum arrangement, the number of vacuum motors employed, etc., are dictated by automotive design considerations. However every automobile temperature control system must employ certain essential component parts besides the condenser, heater core, evaporator, compressor, and clutch. These components parts are broadly defined as including 1) sensor means whereby various levels of modulating vacuum are supplied to the system in accordance with temperature requirements; 2) a servomechanism actuated by the modulated vacuum to control a blend door whereby tempered or blended air is directed to the passenger compartment; and 3) electrical means programmed by the blend door and/or sensor means to supply either heated, cooled or fresh air at various blower speeds through the plenum. Additionally, a diverter valve of some form which manually ports vacuum to the various motors has been employed in such systems when the automatic phase thereof is desired to be switched to one of its manually actuated phases such as vent, defrost, etc.

Because all such controls are mounted in a housing to be assembled as a unit to the automotive vehicle, efforts have been made to provide a more compact arrangement which would positively port vacuum at predetermined conditions with a minimum of electrical circuitry employed therewith. Thus in my previous application assigned to the present assignee and entitled "Automotive Vehicle Automatic Temperature Control System", Ser. No. 238,838, filed Mar. 28, 1972, I have disclosed an electrical programmer servomotor which provides a positive drive contact between the electrical control circuitry and a servomotor actuated at various modulated vacuum levels to control the position of an air blend door. The present invention is directed to an improvement of the servomotor shown in my prior application.

It is thus a principal object of the subject invention to provide a servomotor including a vacuum motor, an electrical programmer, and a linear diverter valve as component parts thereof for use in an automatic temperature control system in automotive vehicles and the like which results in a simpler, more efficient system than heretofore possible.

In accordance with the invention this object is achieved by employing a multifunctional servomotor in an automatic temperature control system of the type including a heater core, an evaporator, a condenser, a compressor, and a clutch connecting the compressor to the engine of the automotive vehicle. The control system additionally includes a source of vacuum and a temperature sensor connected with the source of vacuum for sensing in car and ambient air temperatures whereby the source vacuum is modulated at varying modulated vacuums in accordance with the temperature sensed. The multifunctional servomotor is in vacuum connection with the temperature sensor so as to be actuated in accordance with the modulated vacuum and includes as component parts thereof a vacuum motor, an electrical programmer, and a linear diverter valve. More specifically, the vacuum motor controls the opening and closing of an air blend door which regulates the emission of heated, cooled, and blended air into the passenger compartment. The electrical programmer positively operates, in addition to other system functions, the speed of a blower and a blower motor in accordance with predetermined conditions whereby the flow of heated and cooled air into the passenger compartment is regulated. The linear diverter valve, supplies source vacuum to several other vacuum motors in the system to regulate system functions when the temperature control system is in its automatic phase thereby reducing the complexity of the system, both electrically and mechanically. The system additionally includes a second diverter valve connected to source vacuum and actuable when the automatic temperature control system is placed in one of its manually actuated positions to control the operation of several other servomotors.

In accordance with another feature of the subject invention the servomotor includes a vacuum motor having an especially configured plunger secured to the diaphragm therein and extending from one end of the motor casing. Extending from the same end of the vacuum motor casing parallel to the plunger is an especially configured slotted bracket carrying on its top surface a linear switch. The linear switch includes a series of stationary contacts defined by a printed circuit and a series of stationary contacts carried by a sled member movable along the slot. A driving member connected between the plunger and the sled member in an adjustable manner permits the movable contacts to positively and precisely engage selective stationary contacts upon movement of the plunger.

Secured to a side of the bracket which carries the linear switch is a linear diverter valve. The diverter valve includes a valve body having a central opening therein and a plurality of ports spaced along the body communicating with the opening. A longitudinally extending diverter valve member is disposed within the opening of the body for intercommunicating selective ports dependent upon the position of the diverter valve member within the body. A preformed, stiff actuating wire connected to the diverter valve member at one end and secured to a second bracket formed as part of the plunger in an adjustable manner at its other end provides means for actuating the diverter valve in accordance with predetermined conditions.

It is thus another object of the subject invention to include as part of a control system a servomotor which has a linearly actuated diverter valve as a component part thereof.

It is a still further object of the subject invention to include a servomotor as part of a control system which provides positive means for precisely controlling and adjusting an electrical programmer.

Yet still another object of the subject invention is to include a servomotor as part of a control system which provides positive means for precisely controlling and adjusting a linear diverter valve.

The invention may take physical form in certain parts and arrangement of parts a preferred embodiment of which will be described in detail herein and illustrated in the accompanying drawings which form a part hereof and wherein:

FIG. 8 is an electrical schematic of the circuitry employed in the control system.

Figures 1, 2:
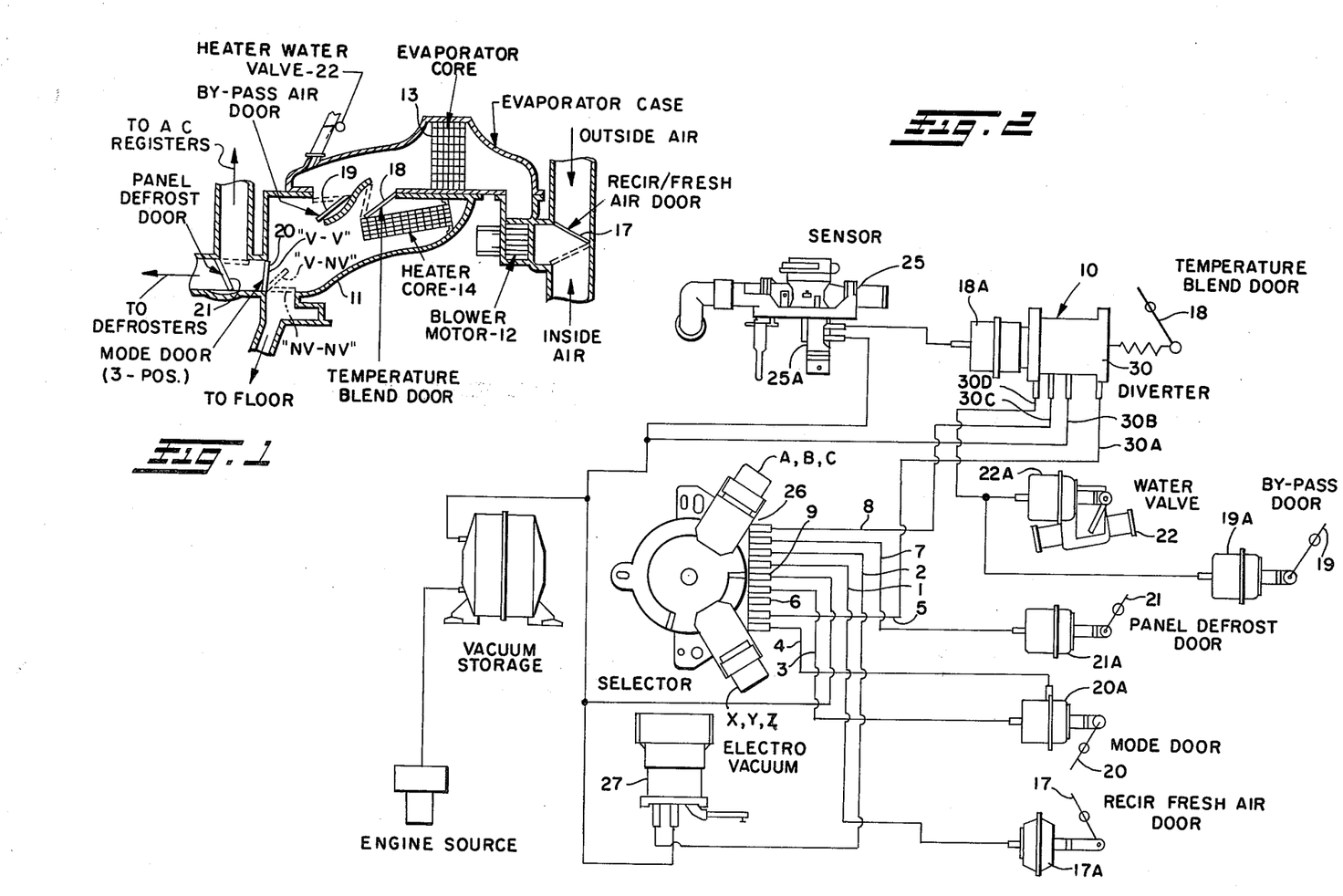
FIG. 1 is a schematic view of the plenum employed in the subject system.
FIG. 2 is a schematic of the vacuum-operated accessories employed in the subject control system.

Referring now to the drawings wherein the showings are for the purpose of illustrating a preferred embodiment of the invention only and not for the purpose of limiting the same, there is shown in FIG. 1 a general arrangement of an automatic temperature control system for use in an automotive vehicle. The control system may be divided into a pressure sensing system shown herein as a negative pressure or vacuum operated system in FIG. 2 which incorporates a servomotor 10 of the present invention and an electrical system shown in FIG. 8 which is controlled by the vacuum system.

THE VACUUM SYSTEM

In FIG. 1 there is shown a plenum 11 having a blower motor 12, an evaporator core 13 and a heater core 14 positioned therein. The plenum may be viewed as a central passageway having a plurality of passageways extending therefrom which lead to different parts of the automotive vehicle as shown. Particularly, flow of air through each of these passages is controlled by a motor-operated door, each door being shown as solid in a V or vacuum condition and shown as dotted in a N-V or non-vacuum condition. The doors or baffles of the system shown (FIGS. 1 and 2) and the vacuum-operated motors associated therewith which are designated by the door number followed by a subscript A are as follows:

1. a recirculating/fresh air door 17 and motor 17A controls circulation of air, either from the passenger compartment or from the outside, into the plenum 11;

2. a temperature blend door 18 and motor 18A controls the amount of tempered or blended air flow through the plenum;

3. a bypass air door 19 and motor 19A controls an increased flow of cooled air through the plenum;

4. a three-position mode door 20 and two-port vacuum motor associated therewith 20A regulates the flow of heated, tempered, or cooled air to the floor or air conditioning registers upon predetermined conditions; and 5. a panel-defrost door 21 and motor 21A governing the flow of either heated or cooled air to the defrosters or the air conditioning registers in the passenger compartment respectively. Additionally, a heater-water valve 22 is operated by a vacuum motor 22A to control the flow of heated water through the heater core 14.

In the vacuum schematic shown in FIG. 2, additional system components not shown in FIG. 1 include a temperature sensor 25, a diverter valve to the selector type 26 and an electrovacuum relay 27. Reference to pending applications entitled "Automotive Vehicle Automatic Temperature Control System" by the present inventor, R. J. Franz, Ser. No. 238,838, filed Mar. 28, 1972; "Vacuum Control Valve" by Kenny et al, Ser. No. 339,262, filed Mar. 8, 1973; and "Temperature Control System and Vacuum Modulator Valve Therefor" by the present inventor, R. J. Franz, Ser. No. 237,766, filed Mar. 24, 1972, all of which are assigned to the present assignee, may be had for more detailed explanation of the structure and function of these parts than will be described herein.

The vacuum connections shown in FIG. 2 include source vacuum from the engine supplied to:

a. a vacuum control valve 25A of the sensor 25 whereby vacuum is modulated at varying levels in accordance with the passenger compartment requirements and transmitted to the servomotor 10;

b. nipple 9 of the selector type diverter valve 26 wherein source vacuum is dead ended in the valve's automatic position as will be explained hereafter;

c. the electrovacuum relay 27 which, when actuated at a predetermined engine temperature, ports vacuum via nipples 1 and 2 of the selector diverter valve 26 to actuate recirculating/fresh air door 17; and d. one of four ports 30A, 30B, 30C, 30D in a linear diverter valve 30 which forms a component part of servomotor 10.

Linear diverter valve 30 will be described in detail hereafter. Suffice to say at this time, that linear diverter valve 30 in essence, controls the automatic phase of the system shown by interconnecting various ports 30A and 30D at different levels of modulating vacuum. More particularly, intercommunication between various ports at various levels of modulating vacuum are shown in Table I, reproduced below, where: a) source vacuum is supplied to port 30B; b) port 30A communicates with nipple 5 of the selector diverter valve 26 which in turn in an automatic position communicates with nipples 3 and 4 thereof to control mode door 20 in a V—V position (FIG. 1); c) port 30C is in communication with nipple 8 of the selector diverter valve 26 which in an automatic position communicates with nipple 7 thereof to control the position of panel-defrost door 21; and d) port 30D of linear diverter valve 30 is in direct communication with vacuum motors operating the water valve 22 and bypass air door 19.

TABLE I

| LINEAR DIVERTER VALVE 30 | | | | |
|---|---|---|---|---|
| Port 30A | VACUUM | | | VENT |
| Port 30B (source vacuum) | | VACUUM | | |
| Port 30C | VENT | | VACUUM | |
| Port 30D | | VENT | | VACUUM |
| ASCENDING VACUUM LEVELS ⟶ | | | | |

Figure 5:
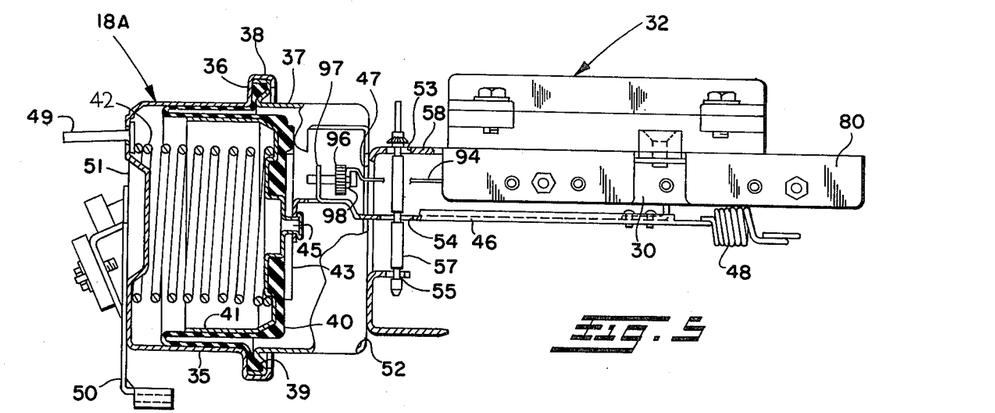
FIG. 5 is a left side elevation view of the servomotor shown in FIG. 3 with certain parts thereof broken away.

The above description details the vacuum operation of the control system when in an automatic position. As known to those skilled in the art, the system is actuated by a lever in the passenger console which is suitably connected to selector diverter valve 26 (not shown) to manually actuated same to one of its several positions. The several positions for the particular system shown comprise vent, auto, defog, and defrost. In each of these positions, the vacuum is ported differently and also electrical connections X,Y,Z, and A,B,C in the selector diverter valve 26 are interconnected in varying sequences to control the electrical circuit of the system as will be described in detail with reference to FIG. 8 hereafter. For ease of explanation, set forth below in Table II are the various vacuum and electrical connections for each setting or predetermined conditions of selector diverter valve 26.

outer peripheral edge of a diaphragm 40 is received within sealing groove 39 and radial flange 36 of the first casing 35 is crimped about radial flange 38 of second casing 37 in a conventional manner to seal diaphragm 40 within the housing assembly. A generally cup-shaped diaphragm reinforcement member 41 is fitted within the internal periphery of diaphragm 40 and serves as a seat for one end of a compression spring 42 which normally biases diaphragm 40 into second casing section 37. Secured to the external side of diaphragm 40 is a circular diaphragm plate 43 which is maintained in tight engagement with diaphragm 40 and reinforcement member 41 by a rivet 45 extending through the center thereof. Also secured to diaphragm plate 43 by rivet 45 is an especially configured plunger 46 which axially extends through an especially configured opening 47 in second casing section 37. Secured to the end of plunger 46 is a calibrated spring 48 for opening and closing in various increments the temperature blend door 18.

TABLE II

| | | SELECTOR PROGRAMMING | | | | |
|---|---|---|---|---|---|---|
| | | | DETENT POSITIONS | | | |
| NIPPLE | FUNCTION | OFF | VENT | AUTO | DEFOG | DEFROST |
| 1 | Recirc.-F/A | to 9 | | to 2 | | |
| 2 | From EVR | seal | seal | to 1 | seal | seal |
| 3 | Floor Partial | | | to 4,5 | to 9 | |
| 4 | Floor Full | | | to 3,5 | | |
| 5 | Port 30A | seal | seal | to 3,4 | seal | seal |
| 6 | No Function | X | X | X | X | X |
| 7 | Defrost/Panel | | to 9 | to 8 | | |
| 8 | Port 30C | seal | seal | to 7 | seal | seal |
| 9 | Source Vacuum | to 1 | to 7 | to 9 | to 3 | to 9 |

| SWITCH SCHEMATIC | TERMINAL CONNECTIONS | | | | |
|---|---|---|---|---|---|
| X—•———•—Y (Z) | none | X-Z | X-Y-Z | X-Y-Z | X-Y-Z |
| A—•———•—B (C) | A-C | A-C | none | A-C | A-B-C |

Blank Space = No Vacuum Condition

It is believed that the table is self-explanatory and further explanation is not required. However it should be noted that in the embodiment shown, the mode door 20 is either in a V—V or NV—NV position (FIG. 1) when selector diverter valve 26 is in an automatic position and in a V–NV position when the selector diverter valve 26 is in a defog position.

THE MULTIFUNCTIONAL SERVOMOTOR

Figure 3:
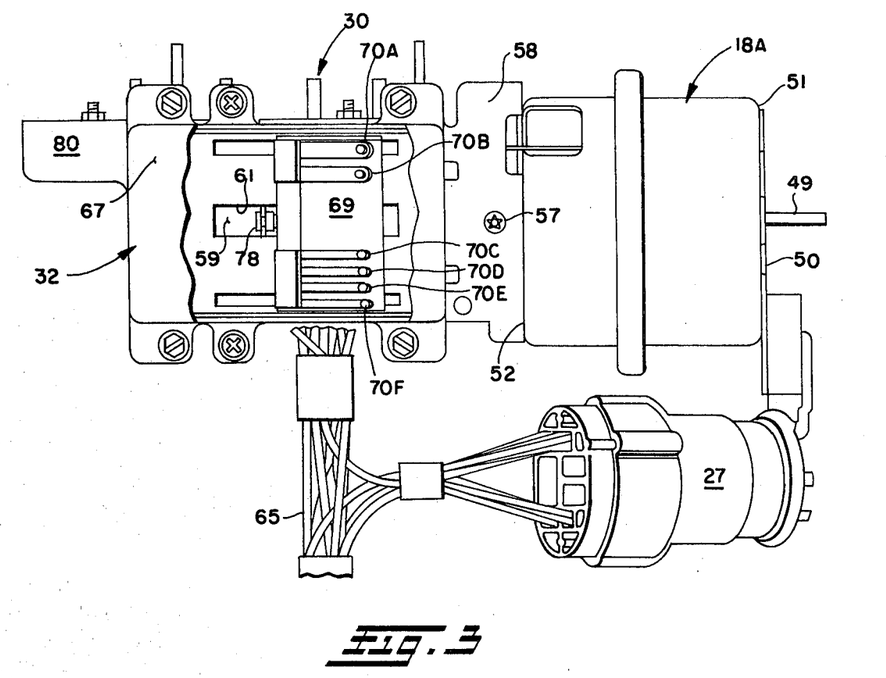
FIG. 3 is a top elevation view with certain parts broken away of a multifunctional servomotor employed in the subject control system.
Figure 4:
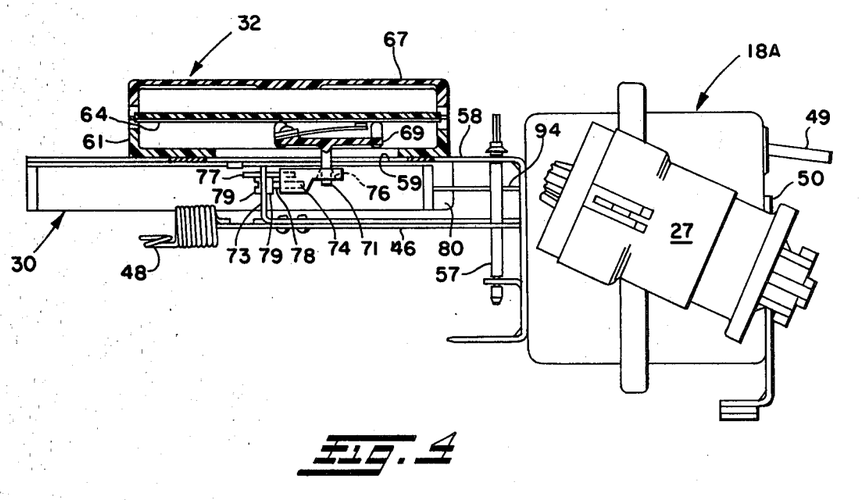
FIG. 4 is a right side elevation view with certain parts broken away of the servomotor shown in FIG. 3.

Servomotor 10 to which this invention particularly relates is shown in FIGS. 3,4 and 5 and includes as component parts thereof a vacuum motor 18A, a linearly actuated diverter valve 30 and an electrical programmer 32.

Vacuum motor 18A as best shown in FIG. 5 is of the conventional type and includes a housing assembly defined by a first cylindrical casing section 35 having a radially extending flange 36 at one end thereof and a second cylindrical casing section 37 also having a radially extending flange 38 at one end thereof which is formed to provide a sealing groove 39 therein. The A vacuum outlet 49 and a first bracket 50 to which is secured the electrovacuum relay 27 is attached to an end 51 of the motor housing casing which is opposite the housing end 52 from which plunger 46 extends.

Extending axially from and permanently affixed to housing end 52 is a right angle slotted bracket 58 having a centrally located, longitudinally extending slot 59 therein which is parallel to plunger 46 (FIGS. 3 and 4).

Bracket 58 also has an elongated hole 53 adjacent vacuum housing end 52 which is directly aligned with a slot 54 in plunger 46 which in turn is aligned with a hole 55 in a second bracket 56 extending from housing end 52 below plunger 46 (FIG. 5). A calibration pin 57 extends through holes 53,55 and slot 54 and provides means for precompressing spring 42 whereby vacuum motor 18A will not be actuated until a predetermined vacuum level has been reached.

Mounted on the top of bracket 58 is the electrical programmer assembly 32. Electrical programmer assembly 32 includes an open-ended, slotted circuit board housing 60 with its slot 61 orientated to be in alignment with slot 59 of bracket 58 (FIGS. 3 and 4). Received within the edge of the open end of the circuit board housing 60 is a fiber board 63, the bottom of which has printed circuit board 64 (foil) secured thereto and the top of which has a plurality of electrical connections (not shown) extending through the fiber board 63 to establish electrical contact via wires 65 with various portions of the printed circuit board 64. A cover 67 is fastened to the open-ended circuit housing 60 to prevent foreign matter from entering therein. Seated within the circuit board housing 60 is an insulated sled member 69 which has a plurality of electrical contacts 70, arranged into two interconnected electrically conductive sets 70A,B and 70C,D,E,F. Contacts 70 are adapted to contact various portions of printed circuit board 64 as the sled member 69 moves relative thereto and complete electrical circuits in a manner which will be described hereafter.

Sled member 69 has a driving stem portion 72 which extends through the slot in circuit board housing 60 and through the slot 59 in bracket 58 (FIG. 4). Driving connection is made with stem portion 71 by a right angle bracket 73 riveted to the plunger 46 and a driver member 74 connected to the bracket 73 and a stem portion 71. More particularly driver 74 has a tapering opening 76 at one end thereof which receives the stem portion 71 in a circumferential line bearing contact. At the other end of the driver 74 are two protruding cylindrical guide studs 77 which are received within similarly shaped holes in bracket 73. Adjustment of the sled member 69 relative to the plunger 46 which fixes the timing of the programming operation is provided by a machine screw 78 threaded into the driver 74 and having a double-head configuration 79 which is received within an open-ended slot (not shown) in right angle bracket 73.

Bracket 58 additionally includes a mounting flange portion 80 depending at a right angle from the axially extending portion of bracket 58. Mounted to the flange 80 is linearly actuated diverter valve 30.

Figures 6, 7, 9:
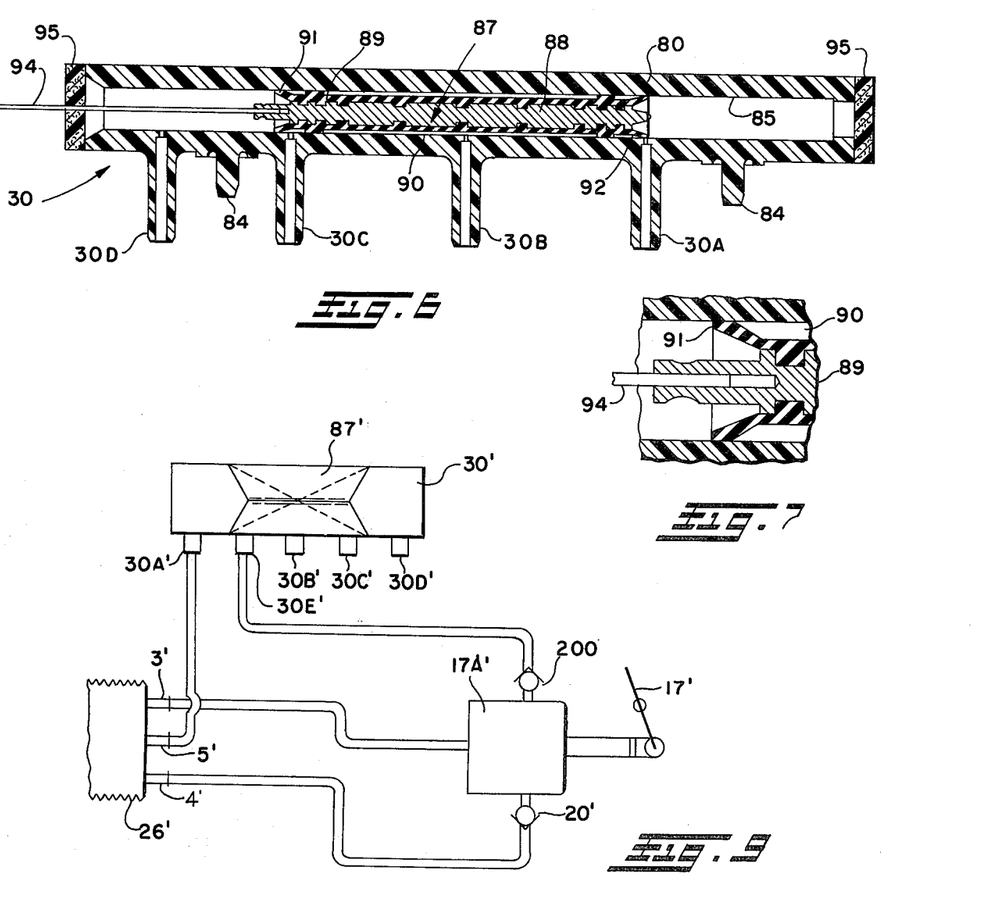
FIG. 6 is a longitudinal cross-sectional view of a linear diverter valve which is a part of the servomotor shown in FIG. 3.
FIG. 7 illustrates a construction detail of the diverter valve shown in FIG. 6.
FIG. 9 is a schematic view of an alternative configuration of the linear diverter valve shown in FIG. 6.

Diverter valve 30 includes a longitudinally extending plastic body 83 having two threaded studs 84 extending from the body and adapted to be received within similarly spaced and sized holes in the flange portion 80 whereby the body 83 is secured to flange 80 (FIG. 6). Body 83 also has a cylindrical bore 85 axially extending therethrough and a plurality of ports herebefore identified as 30A, 30B, 30C, and 30D axially spaced in predetermined relation along the body and communicating with the bore 85. Disposed within the bore 85 is a diverter valve body assembly 87 which includes a stepped cylindrical diverter stem 88 and a resilient sealing member 89 which encloses the diverter stem. As shown in FIG. 7 a clearance 90 exists between the diverter valve body assembly 87 and the cylindrical bore 85 except at the ends 91,92 of the body assembly which are shown flared outwardly in sealing engagement with cylindrical bore 85. Thus the clearance 90 defines a vacuum communication space for intercommunicating one port with another between the ends 91,92 of the valve body assembly 87. The longitudinal distance of the valve body assembly 87 and the spacing between the respective ports 30A–30D is such to provide the communication between the respective ports as hereinbefore defined in Table I set forth above.

The linear diverter valve 30 is actuated by a relatively stiff preformed wire 94 which as shown in FIG. 7 is crimped to a hole formed in the diverter stem 88 extending from valve body assembly end 91. The wire 94 extends through the end of the valve body 83 and each valve body end is shown sealed with a filter medium 95 to prevent foreign matter from entering the valve body bore 85 and disrupting the sealing's effect of the valve body assembly 87. Wire 94 is fastened at its other end by being crimped about an adjusting screw 96. The adjusting screw 96 is threadingly received within a similarly threaded hole in a formed laterally extending portion 97 of the plunger 46 which defines a mounting bracket for screw 96 (FIG. 5). The head 98 of adjusting screw 96 is shown as a spur gear configuration to permit a suitable tool, such as a narrow bladed screw driver, to rotate same for accurate adjustment.

THE ELECTRICAL SYSTEM

The electrical system for the automatic temperature control system thus disclosed is shown in FIG. 8 and includes the electrical programmer assembly 32 for use when the system is placed in its automatic position. Connected to the output of the electrical programmer 32 is a resistor pack arrangement 101 for controlling the speed of blower motor 12. Also connected to the resistor pack 101 and blower motor 12 is a manually actuable blower switch 102 whereby the vehicle operator can override the automatic blower speed when the temperature control system is in any of its positions. Connected as an electrical input to electrical programmer 32 is electrovacuum relay 27 which is operable to complete circuitry to programmer 32 only when the engine temperature reaches a predetermined level (i.e. 130° F.). Alternatively, the EV relay becomes operable by programmer 32 when a maximum air conditioning condition is sensed whereby recirculating/fresh air door 17 is placed in a V position. The electrical system additionally includes the switch assembly 103 of the selector-diverter valve 26 carrying contacts A,B,C and X,Y,Z which are interconnected in a manner shown in Table II above to provide current flow from the battery 144 to EV relay 27, electrical programmer 32, manual blower switch 102, and to clutch 141 of the air compressor.

The diagrammatic illustration of the electrical programmer 32 is indicative of the configuration of the printed circuit board 64 shown in FIG. 4 and includes two sets of contact strips, the first set of contact strips completing a circuit between contacts 70A and 70B of sled member 69 and the second set of contact strip completing a circuit between contacts 70D and 70F of the sled member 69. Contacts 70C and 70E shown in FIG. 3 do not complete circuits with their respective printed circuit strips (not shown) as such are not wired; contacts 70D and 70F being shown only to indicate additional circuitry capacity of the system.

The first set of strips includes a plurality of contacts 110A–G, each being associated with one of four blower motor speeds because the contacts 110 are arranged to pass current through some, none or three of the resistors 1R,2R,3R of the resistor pack 101. The first set of contact strips also includes contact strips 112A and 112B which supply current to contacts 110 via sled contacts 70A and 70B. Contact strip 112A governs the heating phase and contact strip 112B governs the air conditioning phase of the automatic temperature control system.

The second set of contact strips includes contact strip 113 which leads to ground and contact strips 114A and 114B; contact 114B being connected to the ground side of the solenoid 132 in the EV relay 27. Contacts 113 and 114 are interconnected in circuit forming relationship by contact 70D and 70F of the sled member 69.

The electrical programmer 32 shown in FIG. 8 is in an automatic heat condition wherein the modulated vacuum supplied to the servomotor 10 is at its lowest value. In this position the sled member 69 is positioned relative to the printed circuit board 64 to establish communication between contacts 110A and 112A and contacts 113 and 114A. Current is thus supplied from the battery 144 through the ignition switch 142 and through the contacts X,Y,Z of the selector diverter valve switch 103. From selector switch 103 the solenoid actuated clutch 141 for the air conditioner is actuated when the ambient temperature switch 140 is closed. Also when the engine temperature exceeds 130° F, the engine temperature switch 134 is closed completing circuit to ground whereby the solenoid 132 in the EV relay 27 is actuated to close switch 133 to establish a circuit between contacts 130 and 131. Current is thus transmitted between contacts 112A and 110A via contacts 70A and 70B and bypasses resistors 1R,2R,3R in resistor pack 101 to be electrically connected with contact 122 in the manual blower switch 102. Switch contact is made with contact 123 and a voltage drop occurs through resistor 4R of resistor pack 101 following which the current actuates the blower motor 12 after passing through contacts 150,151 of high blower relay 153 which relay is shown in an unactuated state. If desired, the operator can further increase blower speed by actuating switch 120 to provide current flow between contacts 122 and 123 whereby resistor 4R in resistor pack 101 is bypassed. Further when switch contacts A,B, and C selector switch 103 are closed as in a defog position (see Table II above) the solenoid in the high blower relay 153 is actuated to provide current flow from contact 152 through switch 154 to blower contact 150 whereby direct current is supplied to blower motor 12 for high speed actuation thereof.

As the modulated vacuum to servomotor 10 is increased, contacts 70A and 70B will move along contacts 110 and 112 to cut in various resistors 1R,2R and 3R to drop blower speed accordingly. As the modulated vacuum supplied to servomotor 10 further increases contact 70B will make contact with the air conditioning contact 112B which is energized directly from selector switch assembly 103. When maximum modulated vacuum is supplied to servomotor 10, contact 70A establishes circuit with contact 110G and contact 70F is connected to contact 114B to establish a circuit with contact 113 whereby the EV relay solenoid 132 is actuated to control the recirculating/fresh air door 17 even though the engine temperature switch 134 may be in an open position.

The system has thus been explained with reference to its operation in an automatic position of the selector switch assembly 103. Other circuits may be similarly traced from other detent positions of the selector switch which establishes the terminal connections shown in the Table II above for selector switch 103.

The preferred embodiment has been explained with reference to a four-port linear diverter valve 30. In the automatic position of the control system thus described, the diverter valve 30 places mode door 20 in a V—V position when the electrical programmer 32 is in a heat actuating phase and also places the mode door 20 in an NV—NV position when electrical programmer is in an air conditioning phase (see FIG. 1). It is desirable for the comfort of the vehicle operator that a third position of the mode door be provided (i.e. a V-NV condition) when the electrical programmer makes a transition defined as a split phase from the air conditioning to the heating phase. To achieve this effect a five-port linear diverter valve is shown in schematic form in FIG. 9 as an alternative embodiment.

The five-port linear diverter valve 30' shown in FIG. 9 is identical to its four-port counterpart valve 30 previously described except where noted and like numbers designated by a prime (') will indicate like parts where applicable. Four ports 30A', 30B', 30C', and 30D' of the diverter valve 30' are thus connected to the same components and actuated in the same manner as previously described. The fifth port 30E is connected to a vacuum outlet 200 of vacuum motor 17A' which is similar to motor 17 in that both motors are of the known dual diaphragm type wherein vacuum ported to one of the diaphragms actuates the motor plunger one half of its travel. In vacuum motor 17A' the vacuum outlets 200 and 201 in the second diaphragm chamber incorporate check valves therein which prevent the vacuum from being transmitted to the other outlet in case only one such outlet is at vacuum. In this manner vacuum port 30E will place mode door 17' in a V-NV position (FIG. 1) when the electrical programmer is in a split phase. This is more particularly shown in the schematic diagram of Table III set forth below which illustrates the intercommunication of the various ports in the diverter valve 30' as the modulated vacuum therein changes.

TABLE III

|  | LINEAR DIVERTER VALVE 30' | | | |
|---|---|---|---|---|
|  | HEAT | SPLIT | | A/C |
| Port 30A' | VACUUM |  |  | VENT |
| Port 30E |  | VENT | VAC. VENT |  |
| Port 30B' (Source) |  | VACUUM | |  |
| Port 30C' | VENT |  | | VACUUM |
| Port 30D' |  | VENT | | VACUUM |

There thus has been described an automatic temperature control system which may be characterized as incorporating a linear diverter valve actuated in accordance with predetermined conditions to automatically port vacuum to various system components whereby same is actuated. Heretofore actuation of such components such as the water valve had to be accomplished by electrical circuitry regulated by the electrical programmer. This in turn resulted in a costlier and more complex system than that disclosed herein. Additionally by incorporating the linear diverter valve and the electrical programmer as component parts of the servomotor 10 as described herein, an extremely precise regulation of the diverter valve and electrical programmer is achieved which importantly does not become disturbed with extended use.

The invention has been described with reference to a preferred and an alternative embodiment. Obviously, modifications and alterations will occur to others upon a reading and understanding of the specification. It is my intention to include all such modifications and alterations insofar as they come within the scope of the present invention.

It is thus the essence of the invention to provide in an automatic control system means for simultaneously and precisely controlling several functions of said system to thus improve system operation controlling same.

Having thus defined my invention, I CLAIM:

1. A multifunctional servomotor for use in a temperature control system which automatically regulates the temperature of a passenger compartment in an automotive vehicle in accordance with predetermined conditions correlated to varying levels of modulated pressure supplied to said system, said system operable by the positions of several pressure controlled, adjustable baffles in ducts leading to said compartment through which either cooled, heated or blended air may flow; said servomotor comprising:
   a. motor means responsive to said modulated pressures for stroking a plunger extending therefrom to different positions in accordance with said predetermined conditions, said plunger adapted to be operatively connected to one of said adjustable baffles for common movement therewith, wherein said motor means controls the supply of blended air to said system, said motor means comprising a vacuum motor having a casing, a diaphragm in said case, a vacuum outlet at one end of said casing in vacuum communication with one side of said diaphragm, and a plunger connected to the opposite side of said diaphragm and extending from the opposite end of said casing, said plunger connected to an air blend door adapted to control the admission of heated air, cooled air and blended heated and cooled air into said passenger compartment; and
   b. electrical programmer means operatively connected to said plunger for controlling the rate of flow of air through said system in accordance with said predetermined conditions, wherein said electrical programmer means further controls the supply of cooled air to said system; said electrical programmer means including a linear switch positioned adjacent the side of said casing from which said plunger extends and operatively connected to said plunger, said switch having a series of stationary contacts and movable contacts therein, said movable contacts engaging certain of said stationary contacts upon movement of said plunger; and
   c. diverter valve means operatively connected to said plunger for controlling the position of selective baffles, wherein said diverter valve means controls the supply of heated air to said system, said diverter valve means including a diverter valve operatively connected to said plunger and having a plurality of ports therein, at least some of said ports being interconnected in vacuum communication with one another in accordance with said predetermined conditions.

2. The servomotor of claim 1 wherein
adjusting means are provided for varying the relative position of said sled member relative said plunger, said adjusting means including pilot studs extending from said driver through said plunger bracket and thread means affixed to said bracket and said driver for varying the space therebetween.

3. The servomotor of claim 2 wherein
calibrating means are provided for determining the travel of said piston, the unactuated position of said piston and the minimum vacuum supplied to said motor to actuate same,
said calibrating means including said plunger having a predetermined, longitudinally extending slot adjacent said casing end from which said plunger extends, a first bracket affixed to said casing end from which said plunger extends and longitudinally extending generally parallel to said plunger and disposed on one side thereof, a second bracket affixed to said casing end from which said plunger extends and disposed on the opposite side of said plunger, said first and second brackets having first and second holes respectively therein, said first and second holes vertically aligned with one another and with at least a portion of said slot, and a calibrating pin extending through said holes and said slot.

4. The servomotor of claim 3 wherein
said first bracket has a longitudinally extending slot therein,
said switch further includes a housing having an axially extending slot aligned with said slot in said first bracket and mounted on the side of said bracket opposite the side said driver is positioned, said housing further defined as having a flanged open end, a printed circuit and a circuit panel for mounting said printed circuit received within said open end, said circuit board having a plurality of electrical connections thereto to define said stationary contacts in said printed circuit, and a housing having a flanged open end, said flanged end of said housing cover secured to said flanged end of said housing to define said switch.

5. The servomotor of claim 4 further including
bracket means secured to said casing for carrying said diverter valve,
said valve including a longitudinally extending body having a central opening extending therethrough and a plurality of ports spaced along said valve body communicating with said central opening;
a longitudinally extending diverter valve member within said opening, said valve member having a length at least equal to that of the greatest spacing between any two adjacent ports,
sealing means at the end of said diverter valve member to seal said ends of said diverter valve member within said bore, and
actuating means for longitudinally moving said valve member within said opening.

6. The servomotor of claim 5 wherein
said opening and said diverter valve are cylindrical in form,
said diverter valve member further including a stepped cylindrical valve stem and resilient material surrounding said valve stem, resilient material having a diameter at the ends of said diverter stem at least equal to the diameter of said bore and said resilient material having a diameter between said ends of said valve stem less than that of said bore to define a vacuum communicating chamber between said diverter valve member and said opening of said body.

7. An automotive vehicle control system regulating the temperature of the passenger compartment in said vehicle in accordance with predetermined conditions, said system of the type including a heater core, an evaporator, a condenser, a compressor and a clutch connecting the compressor to the engine of said automotive vehicle, said system comprising:
   a. a source of vacuum;
   b. a temperature sensor connected with said source of vacuum for sensing passenger compartment and ambient air temperatures and modulating said source vacuum in accordance with temperature requirements;
   c. power servo means for mechanically controlling system functions, said means including a first power servo-vacuum motor and a plurality of second power servo-vacuum motors;
   d. said first power servomotor being in vacuum connection with said temperature sensor and including an electrical programmer and a first diverter valve as component parts thereof, said programmer and said diverter valve actuable by said first vacuum motor;
   e. a second diverter valve having vacuum connection with said vacuum source and with some of said second plurality of vacuum motors for providing selective vacuum communication with some of second plurality of vacuum motors in accordance with said predetermined conditions;
   f. an air blend door operatively connected to said first motor for controlling the emission of heated air, cooled air and blended air into said passenger compartment;
   g. a blower and a blower motor operable to drive said blower to force heated and cooled air into said passenger compartment;
   h. said programmer completing electrical connections to said blower motor for varying the speed of said blower motor in accordance with said predetermined conditions; and
   i. said first diverter valve being in selective vacuum communication with said source vacuum, with said second diverter valve and with some of said second plurality of vacuum motors.

8. The system of claim 7 further including
a water valve controlling the flow of heated water to said heater core;
one of said second motors controlling the opening and closing of said water valve and defined as a water valve vacuum motor; and
said first diverter valve having a plurality of ports including a first port in vacuum communication with source vacuum and a second port in vacuum communication with said water valve vacuum motor, and stem means within said valve for communicating said first port with said second port upon happening of a predetermined condition.

9. The system of claim 8 further including
a mode door diverting flow of heated air, cooled air and blended air to the floor, to the air conditioning ducts and to the floor and air conditioning ducts in the passenger compartment in accordance with said predetermined conditions;
one of said second vacuum motors controlling the position of said mode door and defined as a vacuum mode door motor;
said second diverter valve having a plurality of ports including a first port in vacuum communication with said source vacuum, a second port in vacuum communication with said vacuum mode door motor, said first and second ports in vacuum communication with one another in a first predetermined condition and out of vacuum communication with one another in a second predetermined condition;
said first diverter valve further including a third port in vacuum communication with a third port in said second valve, said second port and said third port in said second valve being in vacuum communication with said third port in said first valve when said system is in said second predetermined condition.

10. The system of claim 9 wherein
said vacuum mode door motor has a first and second vacuum outlet to position said mode door in one of three positions, said first outlet being in vacuum communication with said second port in said second diverter valve;
said first diverter valve has a fourth port in vacuum communication with said second outlet; and
said first port of said first diverter valve in vacuum communication with said third and fourth ports in said first valve and said third port in said second valve being in vacuum communication with said second port in said second valve and said third port in said first valve when said system is in a third predetermined condition.

11. A multifunctional servomotor for use in a temperature control system which automatically regulates the temperature of a passenger compartment in an automotive vehicle in accordance with predetermined conditions correlated to varying levels of modulated pressure supplied to said system from an initial source vacuum, said system operable by the positions of several pressure controlled, adjustable baffles in ducts leading to said compartment through which either cooled, heated or blended air may flow, said servomotor comprising:
   a. a temperature sensor means connected with the source vacuum for sensing in-car and ambient air temperatures whereby the source vacuum is modulated in accordance with the temperature sensed;
   b. motor means responsive to said modulated pressures for stroking a plunger extending therefrom to different positions in accordance with said predetermined conditions, said plunger adapted to be operatively connected to one of said adjustable baffles for common movement therewith;
   c. electrical programmer means operatively connected to said plunger for controlling the rate of flow of air through said system in accordance with said predetermined conditions; and
   d. diverter valve means operatively connected to said plunger for controlling the position of selective baffles.

12. The servomotor of claim 11 wherein
said electrical programmer means further controls the supply of cooled air to said system;
said diverter means further controls the supply of heated air to said system; and
said motor means further controls the supply of blended air to said system.

13. The servomotor of claim 12 wherein
said pressures are negative and defined as vacuums;
said motor means comprises a vacuum motor having a casing, a diaphragm in said case, a vacuum outlet at one end of said casing in vacuum communication with one side of said diaphragm and a plunger connected to the opposite side of said diaphragm and extending from the opposite end of said casing, said plunger connected to an air blend door adapted to control the admission of heated air, cooled air and blended heated and cooled air into said passenger compartment;

said electrical programmer means including a linear switch positioned adjacent the side of said casing from which said plunger extends and operatively connected to said plunger, said switch having a series of stationary contacts and movable contacts therein, said movable contacts engaging certain of said stationary contacts upon movement of said plunger; and said diverter valve means including a diverter valve operatively connected to said plunger and having a plurality of ports therein, at least some of said ports being interconnected in vacuum communication with one another in accordance with said predetermined conditions.

14. The servomotor of claim 13 further including an axially extending slotted bracket affixed to the end of said casing from which said plunger extends;

a bracket affixed to some point on said plunger;

a drive member affixed to said bracket on said plunger and aligned with said slot in said axially extending bracket; and a sled member carrying said movable contacts and having a stem formed as a part thereof, said stem received within said driver member.

15. The servomotor of claim 14 wherein adjusting means are provided for varying the relative position of said sled member relative said plunger, said adjusting means including pilot studs extending from said driver through said plunger bracket and thread means affixed to said bracket and said driver for varying the space therebetween.

16. The servomotor of claim 15 wherein calibrating means are provided for determining the travel of said piston, the unactuated position of said piston and the minimum vacuum supplied to said motor to actuate same, said calibrating means including said plunger having a predetermined, longitudinally extending slot adjacent said casing end from which said plunger extends, a first bracket affixed to said casing end from which said plunger extends and longitudinally extending generally parallel to said plunger and disposed on one side thereof, a second bracket affixed to said casing end from which said plunger extends and disposed on the opposite side of said plunger, said first and second brackets having first and second holes respectively therein, said first and second holes vertically aligned with one another and with at least a portion of said slot, and a calibrating pin extending through said holes and said slot.

17. The servomotor of claim 16 wherein said first bracket has a longitudinally extending slot therein, said switch further includes a housing having an axially extending slot aligned with said slot in said first bracket and mounted on the side of said bracket opposite the side said driver is positioned, said housing further defined as having a flanged open end, a printed circuit and a circuit panel for mounting said printed circuit received within said open end, said circuit board having a plurality of electrical connections thereto to define said stationary contacts in said printed circuit, and a housing cover having a flanged open end, said flanged end of said housing cover secured to said flanged end of said housing to define said switch.

18. The servomotor of claim 13 further including bracket means secured to said casing for carrying said diverter valve, said valve including a longitudinally extending body having a central opening extending therethrough and a plurality of ports spaced along said valve body communicating with said central opening;

a longitudinally extending diverter valve member within said opening, said valve member having a length at least equal to that of the greatest spacing between any two adjacent ports, sealing means at the end of said diverter valve member to seal said ends of said diverter valve member within said bore, and actuating means for longitudinally moving said valve member within said opening.

19. The servomotor of claim 18 wherein said opening and said diverter valve are cylindrical in form, said diverter valve member further including a stepped cylindrical valve stem and resilient material surrounding said valve stem, said resilient material having a diameter at the ends of said diverter stem at least equal to the diameter of said bore and said resilient material having a diameter between said ends of said valve stem less than that of said bore to define a vacuum communicating chamber between said diverter valve member and said opening of said body.

20. The servomotor of claim 19 wherein said actuating means includes said plunger having a second bracket affixed thereto and a calibration gear affixed to said second bracket, said calibration gear threadingly engaged with said second bracket for axial movement relative to said plunger; and a preformed stiff wire connected at one end to said calibration gear and at its other end to said diverter valve member for moving said diverter valve member relative said valve body.

* * * * *

UNITED STATES PATENT AND TRADEMARK OFFICE
CERTIFICATE OF CORRECTION

PATENT NO. : 3,983,930
DATED : October 5, 1976
INVENTOR(S) : Rudolph J. Franz

It is certified that error appears in the above-identified patent and that said Letters Patent are hereby corrected as shown below:

| | |
|---|---|
| Col. 1, line 38: | "components" should read ----component----. |
| Col. 2, line 16: | in car AND ambient should read----"in car", "ambient". |
| line 52: | "stationary" should read ----movable----. |
| Col. 3, line 65: | V AND N-V should read----"V", "N-V". |
| Col. 4, line 24: | "to" should read ----of----. |
| line 44: | dead ended should read----"dead ended". |
| line 55: | automatic phase should read ----"automatic phase". |
| line 65: | V-V should read----"V-V". |
| Col. 5, line 20: | vent, auto, defog and defrost should read ---- 'vent', 'auto', 'defog' and 'defrost'----. |
| line 51: | V-V and NV-NV should read----"V-V" and "NV-NV". |
| line 53: | V-NV should read----"V-NV"----. |
| Col. 7, line 4: | After "has" insert----a----. |
| line 19: | "72" should read----71----. |
| Col. 8, line 32: | EV should read "EV". |
| line 35: | V should read "V". |
| line 40: | EV should read "EV". |
| Col. 9, line 35: | after "C" insert ---and----. |
| line 63: | EV should read "EV". |
| Col. 10, line 9: | V-V should read "V-V". |
| line 11: | NV-NV should read "NV-NV". |
| line 14: | V-NV should read "V-NV". |
| line 37: | V-NV should read "V-NV". |
| Col. 12, line 63: | After "stem," insert ----said----. |

Signed and Sealed this

Eighteenth Day of January 1977

[SEAL]

Attest:

RUTH C. MASON
*Attesting Officer*

C. MARSHALL DANN
*Commissioner of Patents and Trademarks*